(12) United States Patent
Mallan et al.

(10) Patent No.: US 8,245,805 B2
(45) Date of Patent: Aug. 21, 2012

(54) VEHICLE CAB TILTING DEVICE WITH TELESCOPIC TILTING CYLINDER

(75) Inventors: Roeland Mallan, Enschede (NL); Ivo Gert-Jan Maria Reinink, Oldenzaal (NL)

(73) Assignee: Actuant Corporation, Menomonee Falls, WI (US)

( * ) Notice: Subject to any disclaimer, the term of this patent is extended or adjusted under 35 U.S.C. 154(b) by 166 days.

(21) Appl. No.: 12/867,446

(22) PCT Filed: Feb. 18, 2009

(86) PCT No.: PCT/NL2009/000036
§ 371 (c)(1),
(2), (4) Date: Oct. 28, 2010

(87) PCT Pub. No.: WO2009/104954
PCT Pub. Date: Aug. 27, 2009

(65) Prior Publication Data
US 2011/0036084 A1    Feb. 17, 2011

(30) Foreign Application Priority Data
Feb. 21, 2008    (NL) .................................... 2001308

(51) Int. Cl.
*B62D 33/067* (2006.01)
*F15B 15/16* (2006.01)
(52) U.S. Cl. ............ 180/89.14; 296/190.04; 296/190.05
(58) Field of Classification Search ............... 180/89.13, 180/89.14, 89.15, 89.16, 89.17, 89.18, 69.2, 180/69.21; 296/190.01, 190.04, 190.05, 296/190.06, 190.07; 254/93 VA, 93 R; 60/480; 91/167 R, 169; 92/51, 52, 62, 107
See application file for complete search history.

(56) References Cited

U.S. PATENT DOCUMENTS

| | | | | |
|---|---|---|---|---|
| 2,933,070 A | * | 4/1960 | Trumper et al. | 91/169 |
| 3,128,674 A | * | 4/1964 | Ganchar et al. | 91/167 R |
| 3,642,316 A | * | 2/1972 | Porth et al. | 296/190.05 |
| 3,761,123 A | * | 9/1973 | Neill et al. | 296/190.05 |

(Continued)

FOREIGN PATENT DOCUMENTS
DE    26 41 926 A1    3/1978
(Continued)

OTHER PUBLICATIONS

International Search Report and Written Opinion as mailed on Jun. 4, 2009 for International Patent Application PCT/NL2009/000036.
Search Report and Written Opinion from NL Patent Application 2001308.

*Primary Examiner* — Joseph Rocca
(74) *Attorney, Agent, or Firm* — Quarles & Brady LLP (57) ABSTRACT

A vehicle cab tilting device for a vehicle with a tiltable cab, a chassis and pivot means which connect the cab to the chassis, in which the cab can be tilted through an angle with respect to the chassis between a driving position and a forwardly tilted position. The tilting device comprises a pump (1) having at least one pump port (2) for delivering pressurized hydraulic fluid, a reservoir for hydraulic fluid (3), and a hydraulic tilting cylinder (20) for tilting the cab, which tilting cylinder has a first and a second connection port (21, 22). The tilting cylinder is a multistage telescopic hydraulic tilting cylinder with an outer telescopic part (30), at least one intermediate telescopic part (40), and a central telescopic part (50), each intermediate telescopic part and the central telescopic part being displaceable with respect to one another and to the outer telescopic part.

15 Claims, 8 Drawing Sheets

U.S. PATENT DOCUMENTS

| | | | |
|---|---|---|---|
| 3,847,244 A * | 11/1974 | Fairbanks, Jr. | 180/89.15 |
| 3,958,659 A * | 5/1976 | Selman | 180/89.15 |
| 5,398,774 A * | 3/1995 | Nilsson et al. | 180/89.14 |
| 6,948,580 B2 * | 9/2005 | Scholten et al. | 180/89.14 |
| 7,055,637 B2 * | 6/2006 | Mallan et al. | 180/89.14 |
| 7,849,946 B2 * | 12/2010 | Åkeson et al. | 180/89.14 |

FOREIGN PATENT DOCUMENTS

| | | |
|---|---|---|
| DE | 36 17 080 A1 | 11/1987 |
| JP | 01 197184 A | 8/1989 |
| WO | 99/45280 A | 9/1999 |
| WO | 02/28697 A | 4/2002 |

* cited by examiner

VEHICLE CAB TILTING DEVICE WITH TELESCOPIC TILTING CYLINDER

CROSS-REFERENCE TO RELATED APPLICATIONS

This application claims the benefit of PCT International Application No. PCT/NL2009/000036 filed on Feb. 18, 2009, which claims the benefit of Netherlands Patent Application No. 2001308 filed Feb. 21, 2008, both of which are incorporated herein by reference.

The invention relates to a vehicle cab tilting device for a vehicle having a tiltable cab, a chassis and pivot means which connect the cab to the chassis in which the cab can be tilted with respect to the chassis between a driving position and a forwardly tilted position. In the forwardly tilted position, it is for example possible to carry out maintenance on a vehicle engine which is arranged under the cab.

In a generally known embodiment, a vehicle cab tilting device comprises a pump having at least one pump port for delivering pressurized hydraulic fluid, and a reservoir for hydraulic fluid. In addition, a tilting device of this type usually comprises a hydraulic tilting cylinder for tilting the cab, which tilting cylinder has a first and a second connection port, it being possible for the first and second connection ports to be connected to the pump port and the reservoir by one or more valves for selectively retracting or extending the tilting cylinder. It is also known to use a pump having two pump ports, in which the manner in which the pump is operated—for example the direction of rotation of an electric pump engine which may be present—determines via which pump port hydraulic fluid is delivered, so that the tilting cylinder retracts or extends.

In a popular embodiment, the tilting cylinder is a double-acting cylinder, so that the tilting cylinder produces a force upon extension, usually in order to cause the cab to tilt forwards, and produces a force in the opposite direction upon retraction, usually in order to tilt the cab, which is often tilted forward, beyond the dead point backwards, in the direction towards the driving position.

DE 26 41 926 and JP01-197184 show vehicle cab tilting devices having a telescopic tilting cylinder. These documents show no details of the tilting cylinders.

It is an object of the invention to provide alternative vehicle cab tilting devices with telescopic tilting cylinders.

It is a further object of the invention to provide alternative vehicle cab tilting devices with a tilting cylinder which takes up relatively little space in the vehicle, in particular in the area under the cab.

It is a further object of the invention to provide alternative vehicle cab tilting devices with telescopic tilting cylinders which operate safely and reliably.

One or more of the abovementioned objects are achieved by the invention by providing vehicle cab tilting devices with a multistage telescopic hydraulic tilting cylinder as described in independent claims 1 and 4.

In a suitable embodiment, the solutions according to the invention function reliably, irrespective of whether the centre of gravity of the cab being moved past the pivot takes place during the extension of the central telescopic part or of the intermediate telescopic part when the cab is being tilted forward. In the case of a vehicle, that moment can also be influenced by any slope (either upward or downward) on which the vehicle may be situated.

When extending the tilting cylinders, it is advantageous that the relatively thin central telescopic part only extends at the last moment, as, in practice, the force to be delivered for extending is often greatest at the start of the forward tilting movement of the cab and decreases as the centre of gravity of the cab is moved to the vertical plane through the pivot. As a result thereof, the resistance against buckling of the tilting cylinder is as great as possible. Also, it is ensured that the central telescopic part retracts first when the cab is tilted backwards again.

The invention also relates to a method for tilting a tiltable vehicle cab, in which use is made of a vehicle cab tilting device according to the invention.

The tilting cylinder according to the invention is particularly advantageous in an application in which the centre of gravity of the cab—in a normal horizontal position of the vehicle—is tilted forwards, past the pivot formed by the pivot means. During retraction of the tilting cylinder, a tensile force can be exerted on the cab in order to move the cab backwards again.

The solutions according to the invention, and advantageous aspects and variants, will be described in more detail below with reference to the drawing.

A preferred embodiment of a vehicle cab tilting device for a vehicle with a tiltable cab will now be explained with reference to FIG. 1.

A vehicle of this type (not shown in any more detail) will in practice often be a lorry having a chassis and an engine, with the engine (at least partially) being arranged underneath the cab. In order to provide access to the engine, the cab can be tilted forward. The cab is connected to the chassis via pivot means, so that the cab can be tilted at an angle with respect to the chassis between a driving position and a forwardly tilted position. In practice, a vehicle cab often weighs at least a few hundred kilograms.

The tilting device has a pump 1 having at least one pump port 2 for delivering pressurized hydraulic fluid. Furthermore, a reservoir 3 for hydraulic fluid is provided, from which the pump can draw in liquid. The reservoir 3 is preferably a closed reservoir with a pressure-relief valve 4, which is customary in such tilting devices. FIG. 1 furthermore shows a pressure-limiting valve 6 which opens a passage between the pump port 2 and the reservoir if a maximum pressure is exceeded.

The pump 1, the reservoir 3 and the pressure-limiting valve 6 are in this case—as is often done in practice—incorporated in a unit 10 which is mounted on the chassis of the vehicle. A control valve 9 is furthermore incorporated in said unit 10 in this case.

The tilting device furthermore comprises a hydraulic tilting cylinder 20 for tilting the cab. In a general sense, the cylinder 20 is fitted between the chassis and the cab, if desired in the presence of mechanical lost-motion provisions, which is not the case here.

In this example, reference numeral 11 diagrammatically indicates first attachment means which are designed to attach the cylinder 20 to the chassis of the vehicle, and reference numeral 12 denotes second attachment means which are designed to be attached to the cab of the vehicle. It should be noted that it is also conceivable to arrange the cylinder 20 between the cab and the chassis the other way round.

The tilting cylinder 20 is a multistage (in this case two-stage) telescopic hydraulic tilting cylinder. The tilting cylinder 20 has a first connection port 21 and a second connection port 22, with the illustrated location and embodiment being purely diagrammatical and not being limited thereto.

The cylinder 20 has an outer telescopic part 30, an intermediate telescopic part 40, and a central telescopic part 50, the intermediate telescopic part 40 and the central telescopic part 50 being displaceable with respect to one another and to the outer telescopic part 30.

The outer telescopic part 30 has a cylinder tube 31, which is provided with a bottom 32 at an axial end and a head 33 with a bore hole at the other axial end. A sealing ring 34 is provided at the bore hole in the head.

The intermediate telescopic part 40 is arranged in the cylinder tube 31 of the surrounding (in this case outer) telescopic part 30 and is provided with a cylinder tube 41 as piston rod and with a piston part 42, in which the intermediate telescopic part 40 has a bottom 43 at an axial end and a head 44 with a bore hole at the other axial end.

It can be seen that the piston rod 41 of the intermediate telescopic part 40 extends through the bore hole in the head 33 of the surrounding (in this case outer) telescopic part 30 and the piston part 42 delimits a bottom-side chamber 35 and an annular rod-side chamber 36 in the surrounding cylinder tube 31.

The central telescopic part 50 has a piston rod 51, which in this case, as is preferred, is solid in cross section, and a piston part 52, in such a manner that the piston rod 51 extends through the bore hole in the head 44 of the surrounding intermediate telescopic part 40 and the piston part 52 delimits a bottom-side chamber 45 and an annular rod-side chamber 46 in the tubular piston rod 41 of the surrounding intermediate telescopic part 40.

The first connection port 21 is arranged in such a manner that—in each position of the telescopic cylinder 20—it is in direct communication with the bottom-side chamber 35 in the outer telescopic part 50.

The second connection port 22 is arranged in such a manner that—in each position of the telescopic tilting cylinder 20—it is in direct communication with the rod-side chamber 46 in the tubular piston rod 41 of that intermediate telescopic part 40 which directly surrounds the central telescopic part 30.

In addition, an open passage 48 which, as is preferred here, has no valves, is provided in the bottom 42 of the intermediate telescopic part 40. In each position of the telescopic tilting cylinder 20, the open passage 48 extends between the bottom-side chamber 45 in the respective intermediate telescopic part 40 and the bottom-side chamber 35 of the surrounding telescopic part 30.

The open passage 48 preferably has no valve assembly comprising one or more valves. Preferably, the open passage 48 is of sizeable dimensions, so that the passage 48 does not present any significant resistance. If attenuation of the cylinder movement is desired, the open passage 48 can be designed as a throttle.

In the intermediate telescopic part 40, a through-passage 49 is present which, at one end, ends at the annular rod-side chamber 36 in the surrounding telescopic part 30 and which, at the other end, ends at an opening on the inner side of the respective intermediate telescopic part 40. Said opening is arranged in such a manner that, in a retracted position of the (in this case central) telescopic part 50 situated inside, the respective opening is in direct communication with the annular rod-side chamber 46 in the respective intermediate telescopic part 40 in which the opening is provided, and, in an at least partly extended position of the telescopic part 50 situated inside, is in communication with the bottom-side chamber 45 in the respective intermediate telescopic part 40 in which the opening is provided.

In order to extend the telescopic tilting cylinder, the control valve 9 is operated in such a manner that both the first and the second connection ports 21, 22 are connected to the pump port 2, so that—from the retracted position of the cylinder 20—the intermediate telescopic part 40 together with the central telescopic part 50 extends first, until the intermediate telescopic part 40 reaches its maximum extended position, after which, finally, the central telescopic part 50 extends with respect to the surrounding intermediate telescopic part 40.

Connecting the two ports 21, 22 to the pump port 2 by extending the tilting cylinder 20 results in the chambers in the cylinder 20 being completely filled with liquid, in particular at the point in time when the centre of gravity of the cab moves past a vertical plane through the pivot of the cab and the cab falls forwards and starts to pull on the cylinder 20. If one or more chambers in the cylinder 20 were not filled completely, this movement could then partially take place without damping, which is undesirable.

In order to retract the telescopic tilting cylinder 20, the second connection port 22 is connected to the pump port 2 and the first connection port 21 to the reservoir 3 by operating the control valve 9, so that—from the extended position of the cylinder 20—the central telescopic part 50 retracts first, until the piston part 52 thereof passes the opening of the through-passage 49 and thus connects the piston-rod-side chamber 46, to which the second connection port 22 is connected, to the piston-rod-side chamber 36 of the surrounding telescopic part 30, so that the central telescopic part 50 together with the surrounding intermediate telescopic part 40 is then retracted, until the intermediate telescopic part 40 and the central telescopic part 50 are retracted completely.

The outer telescopic part 30 is in this case provided with a lost-motion bypass 39, in such a manner that, in a bypass section of the axial movement of the intermediate telescopic part 40 which is displaced therein, the rod-side chamber 36 and the bottom-side chamber 35 in the outer telescopic part 30 are in communication with one another. The bypass 39 may be designed in various known manners, for example as a bypass line with two ports which are at an axial distance from one another or as a groove in the inner side of the cylinder tube 31, etc.

Figure 1:
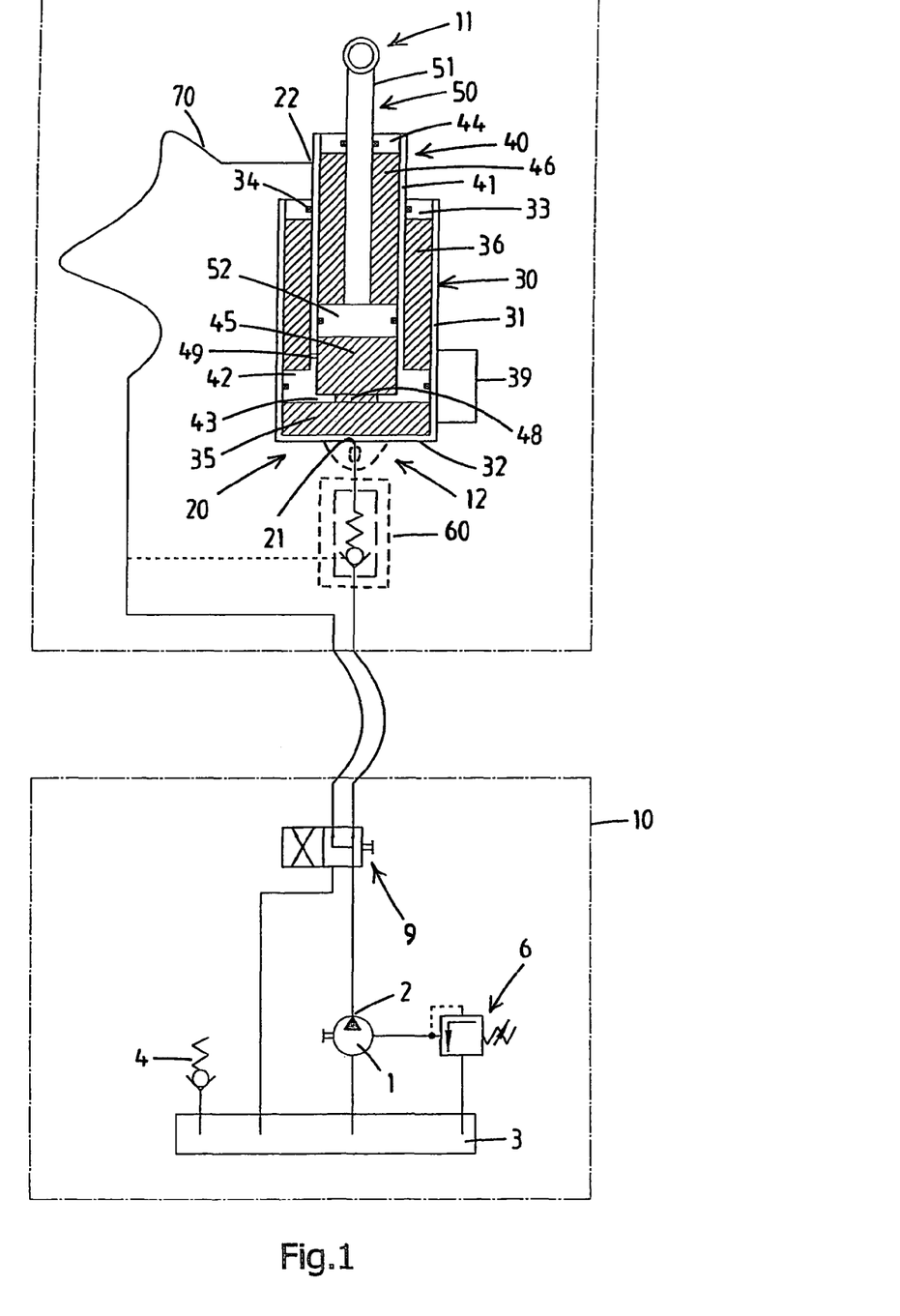
FIG. 1 diagrammatically shows a first preferred embodiment of a vehicle cab tilting device according to the invention, FIG. 2 diagrammatically shows an alternative embodiment of the tilting cylinder in a vehicle cab tilting device according to the invention, FIG. 3 diagrammatically shows a further preferred embodiment of a vehicle cab tilting device according to the invention, FIG. 4 diagrammatically shows a further embodiment of a tilting cylinder in a vehicle cab tilting device according to the invention, FIG. 5*a* diagrammatically shows a further embodiment of a vehicle cab tilting device according to the invention.

Furthermore, FIG. 1 also shows a pressure-actuated non-return valve 60 in the connection from the pump 1 to the connection 21. This valve 60 ensures that the cylinder 20 does not retract unless pressurized hydraulic fluid is delivered to the connection 22 via the pump 2.

It can furthermore be seen that a flexible hose 70 is provided which adjoins the second connection 22 which, in this example, is situated on the telescopic part 40 and therefore has a variable position. In a variant (not shown), the second connection 22 is arranged on the central telescopic part 50, preferably near the free end of the piston rod 51, with a duct extending through the central telescopic part (in this case through rod 51) from the second connection port which opens into the rod-side chamber 46 of the surrounding intermediate telescopic part 40. As a result thereof, the connection 22 has a more or less fixed position and a long hose can be dispensed with. It will be clear that other embodiments of the location of the second connection 22 and the manner in which connection with this second connection 22 is effected fall within the scope of the invention.

Figure 2:
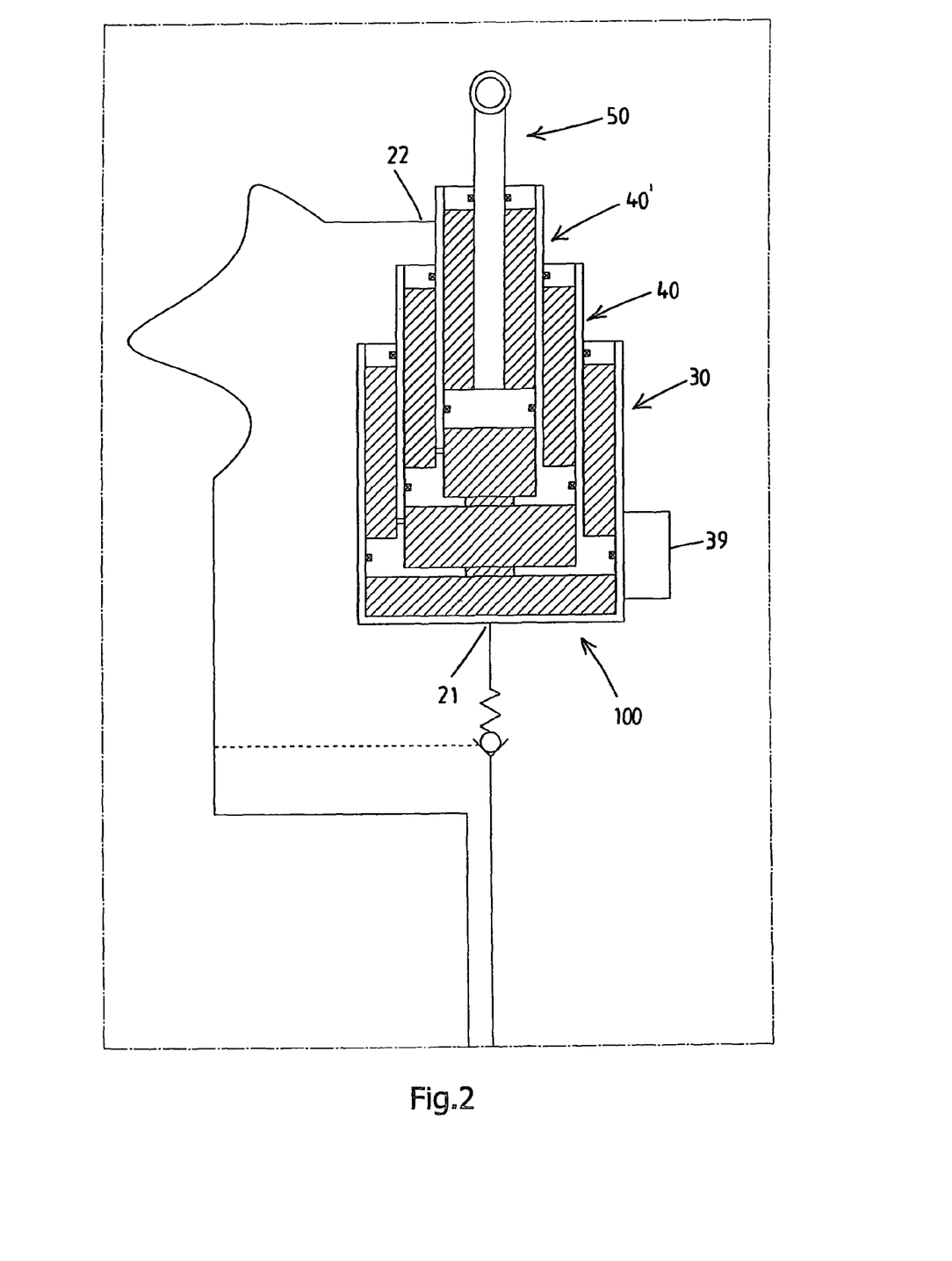

FIG. 2 diagrammatically shows a three-stage tilting cylinder 100 which can, for example, be used as an alternative for cylinder 20. Using the description of the cylinder 20, the person skilled in the art will understand that the operation of the cylinder 100 is in principle identical to that of cylinder 20 and that the same advantageous effects are achieved using cylinder 100. It can be seen that the cylinder 100 has two intermediate telescopic parts (denoted here by reference numerals 40 and 40'), the construction of which is identical with the telescopic part 40 of cylinder 20.

Figure 3:
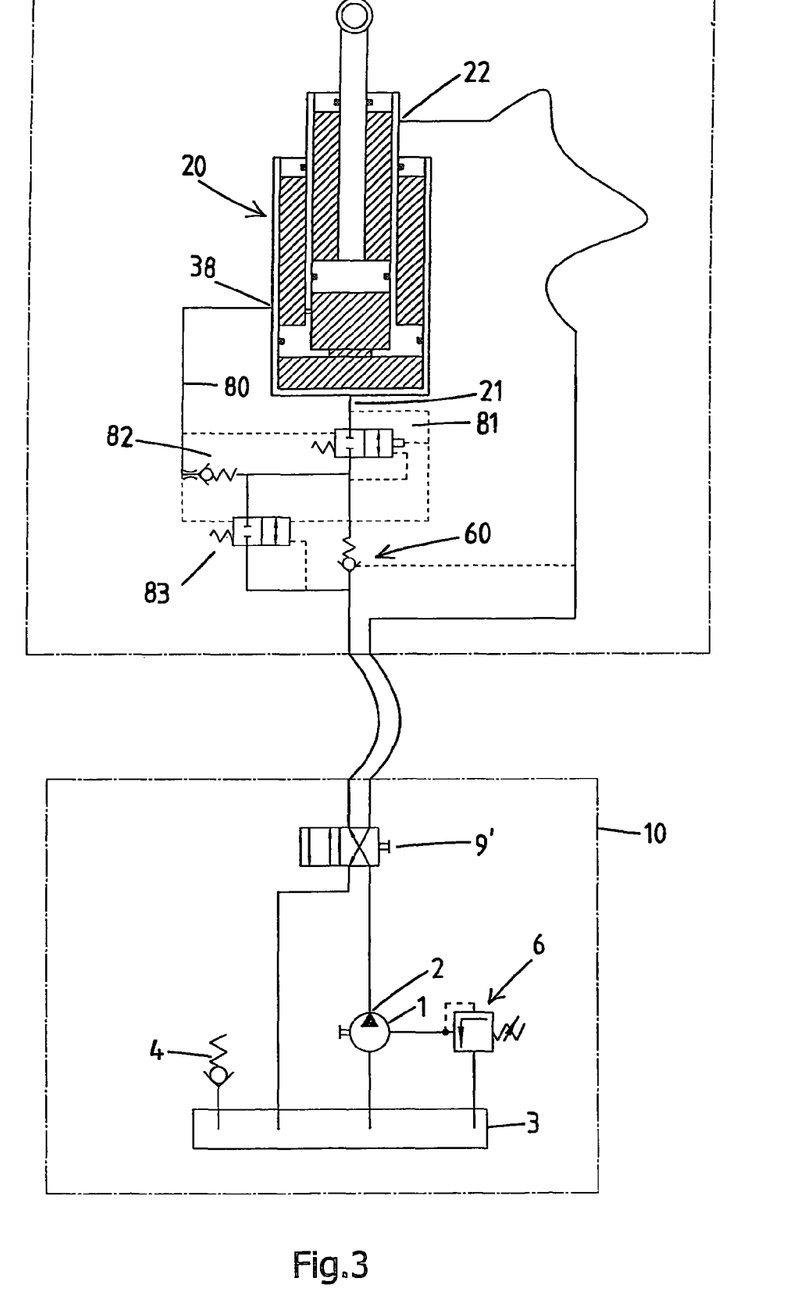

FIG. 3 shows a unit 10 with a control valve 9' which is designed as a variant of the control valve 9, so that a port of the unit 10 is either connected to the pump port 2 or to the reservoir 3 and the other port of the unit 10 is then, conversely, connected to the reservoir or just to the pump port.

When the cylinder 20 is being extended, pressurized hydraulic fluid is delivered to the first connection 21, and the second connection 22 is in communication with the reservoir 3. Compared to the arrangement in FIG. 1, this results in a relatively large extension force, for example in order to be able to tilt a relatively heavy cab when there is little installation space for the cylinder 20.

FIG. 3 also shows that a lost-motion connection 80 is present between a bypass passage 38 in the outer telescopic part 30 and the first connection port 21 of the tilting cylinder, which lost-motion connection 80 is provided with one or more hydraulic valves 81, 82, 83, so that a lost-motion operation is achieved in a manner known per se. It will be clear that alternative lost-motion solutions are also within the scope of the invention.

Figure 4:
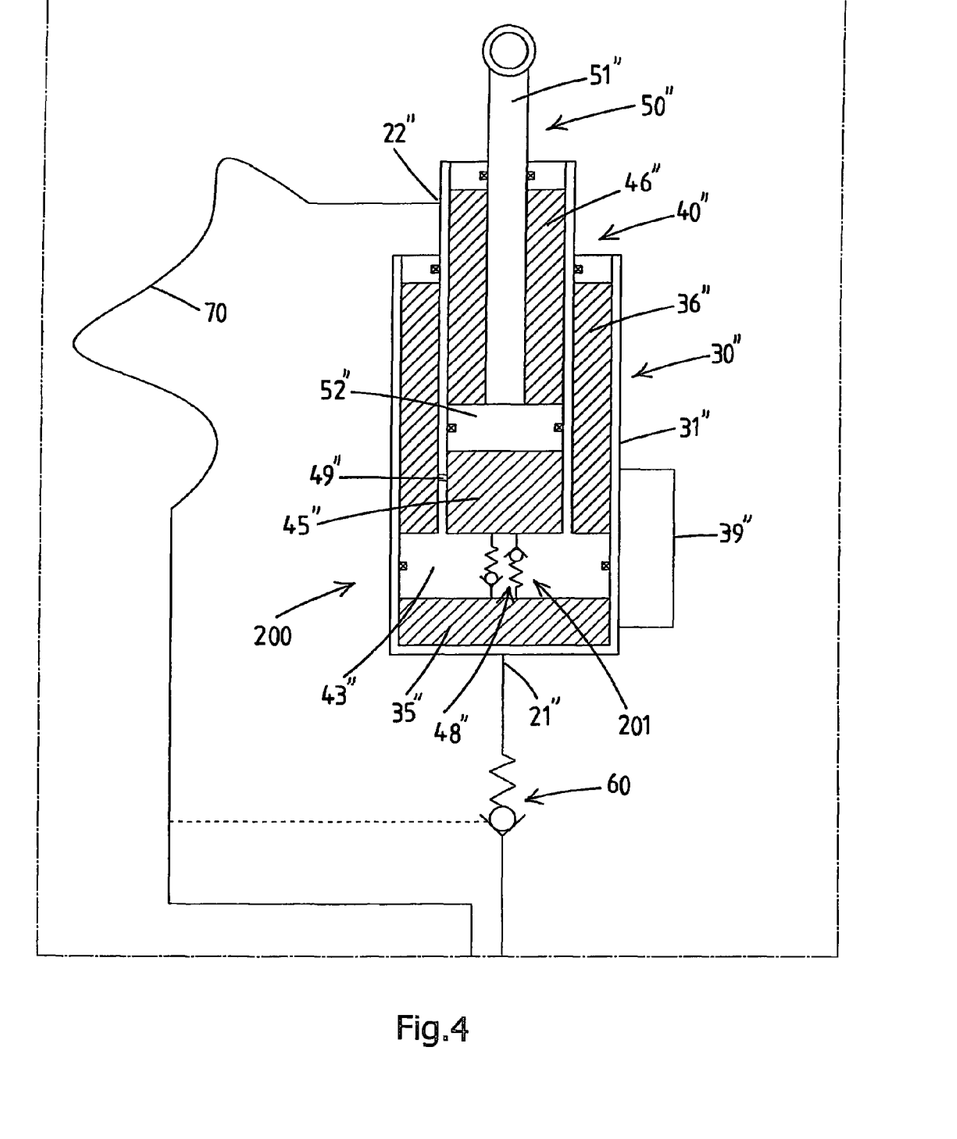

FIG. 4 shows a tilting cylinder 200 which corresponds to the tilting cylinder explained above in many ways. Identical parts are denoted in the figure by means of double inverted commas and will not be explained in any more detail here.

It can be seen that a valve assembly 201 which may comprise one or more valves is provided at the passage 48" in the bottom 43" between the chambers 35" and 45".

The valve assembly 201 is preferably a valve assembly comprising one or more valves which is operated by pressure difference between the chambers 35" and 45", which valve assembly is closed below a certain pressure difference between the chambers 35" and 45" which are connected by the passage 48", and open at a pressure difference which is greater than said pressure difference value which is, in this case, for example 1 bar.

As the person skilled in the art will already have seen from the diagrammatical representation in FIG. 4, a practical embodiment is provided with an anti-suction valve in the passage 48", which opens, for example, at a pressure difference of 1 bar.

A preferred embodiment of a vehicle cab tilting device according to claim 4 will now be explained with reference to FIGS. 5a,b and 6. This embodiment comprises a single intermediate telescopic part, which is preferred in practice. FIG. 7 shows a variant thereof, which is provided with several, in this case two, intermediate telescopic parts.

Similar to the tilting devices according to FIGS. 1-4, tilting devices according to claim 4 are particularly advantageous when used in a vehicle where the centre of gravity of the cab moves past the pivot of the cab when the latter is tilted forwards. When the tilting cylinder is extended, the central telescopic part will be the last to extend. During retraction, in order to tilt the cab backwards, first the central telescopic part is pushed in, successively followed by the one or more intermediate telescopic parts.

Figure 5A:
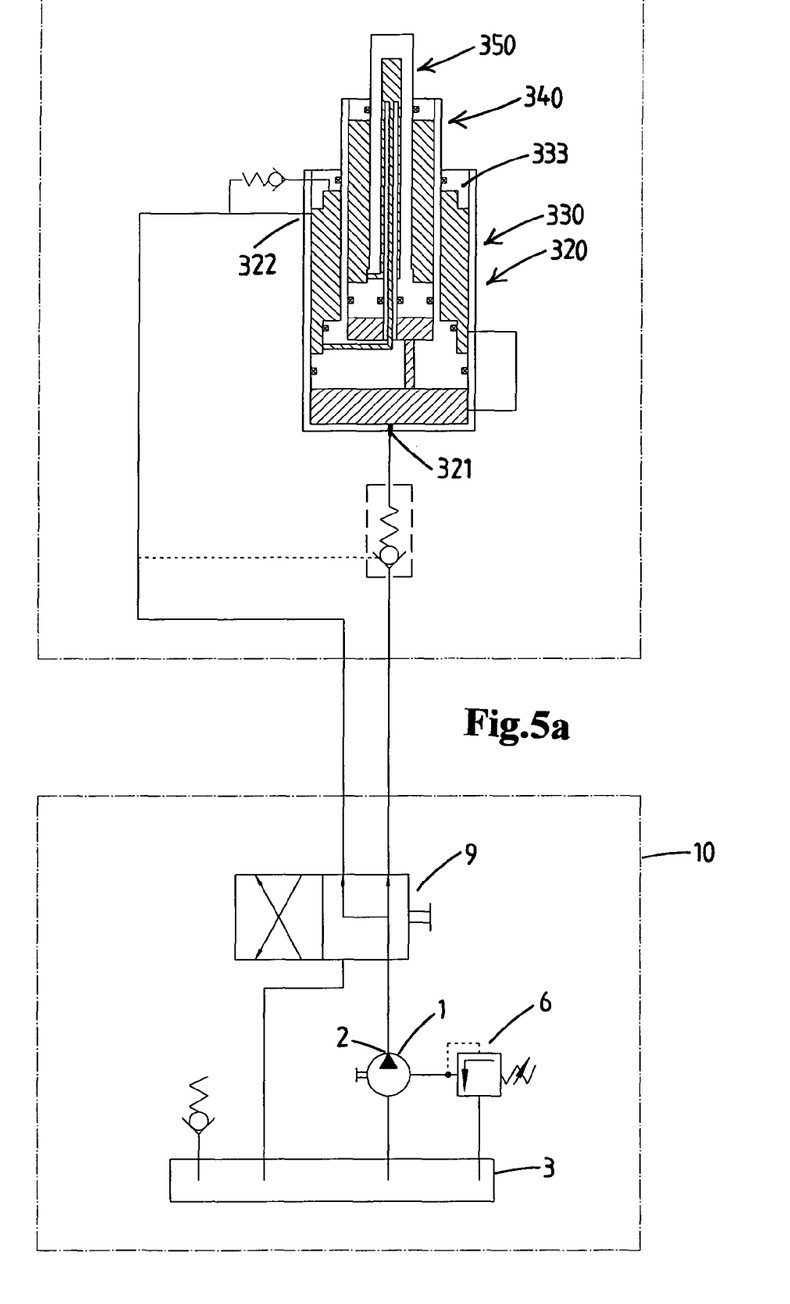
Figure 6:
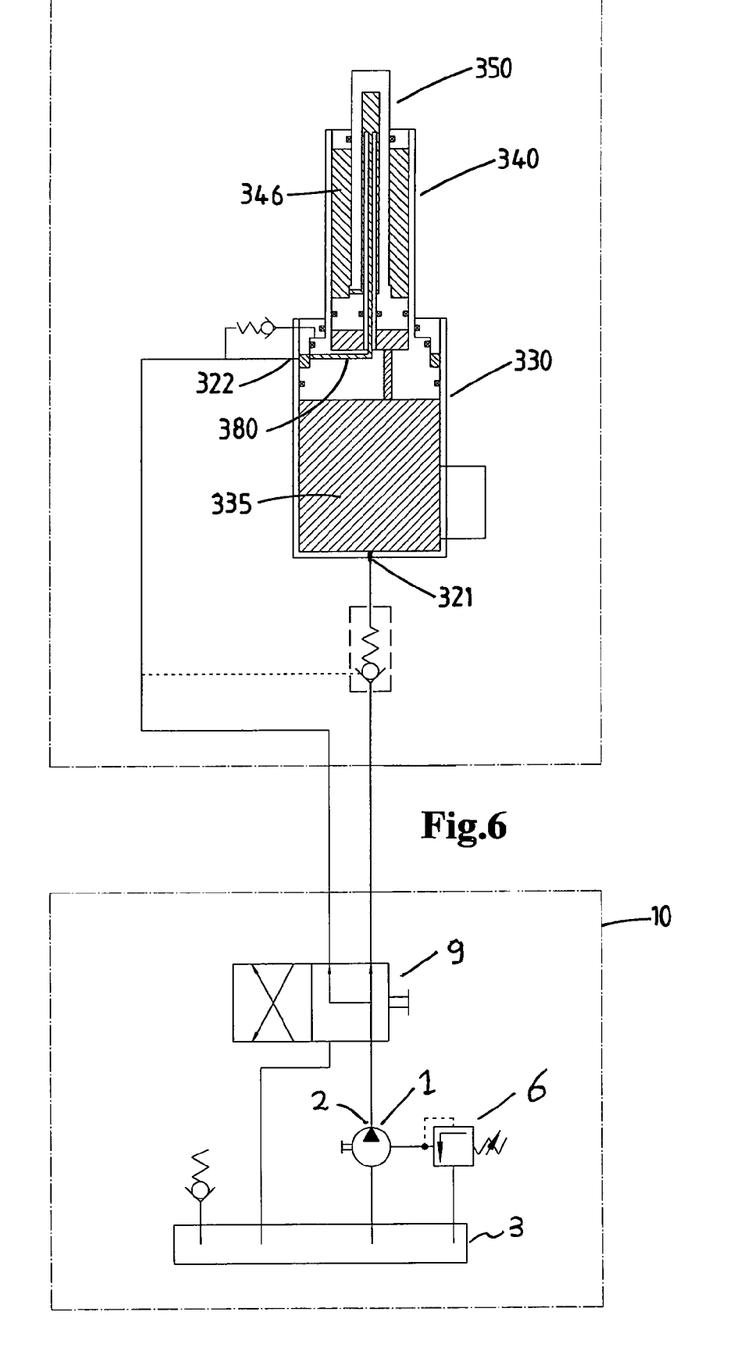
Figure 7:
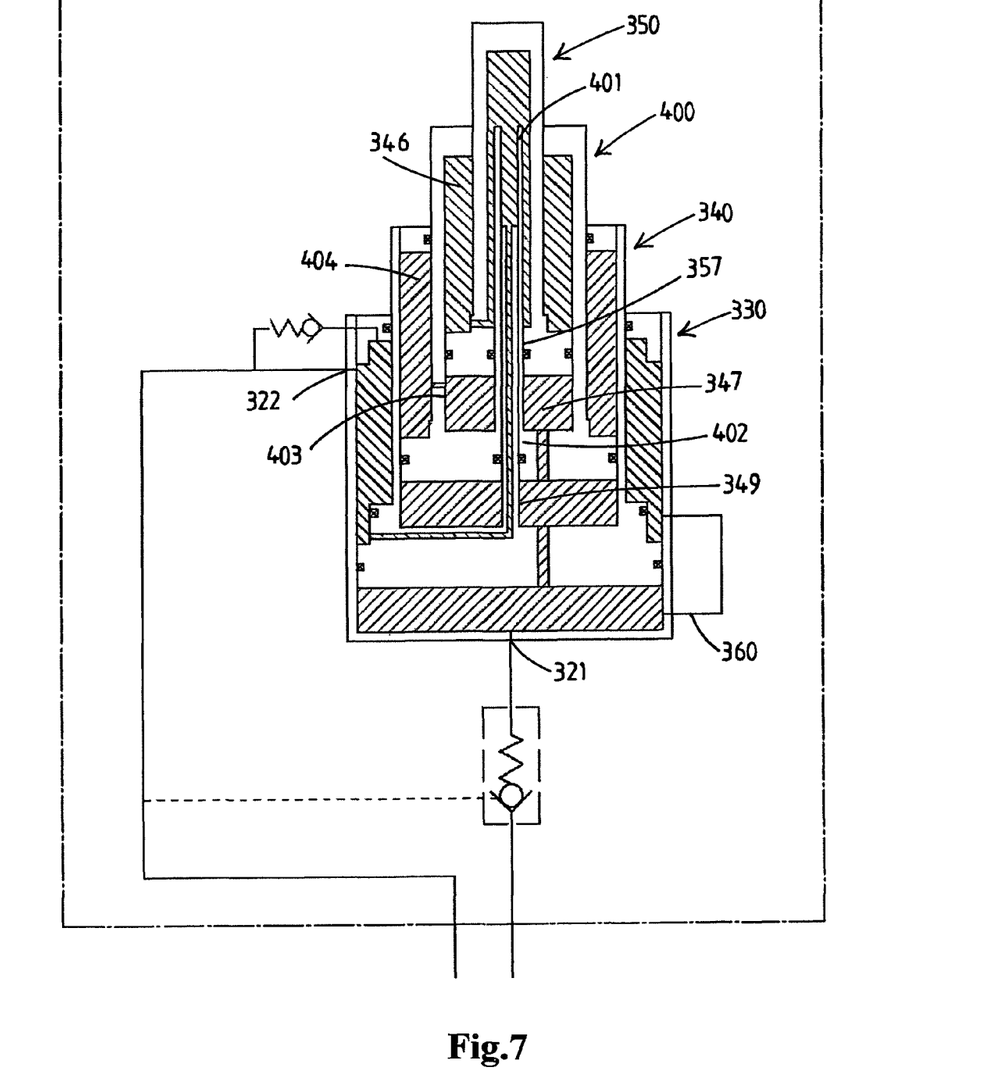
FIG. 7 shows a variant of the embodiment from FIG. 5*a*, in which several intermediate telescopic parts are provided.

FIGS. 5a and 6 show the pump unit 10 with a pump 1 and a reservoir 3, as well as a control valve 9.

A hydraulic tilting cylinder 320 for tilting the cab is shown diagrammatically, which tilting cylinder has a first connection port 321 and a second connection port 322.

The tilting cylinder 320 is a multistage telescopic hydraulic tilting cylinder with an outer telescopic part 330, a single intermediate telescopic part 340, and a central telescopic part 350.

The outer telescopic part has a cylinder tube 331, which is provided with a bottom 332 at an axial end and a head 333 with a bore hole at the other axial end. The bore hole is provided with a sealing ring.

The intermediate telescopic part 340 is provided with a cylinder tube 341 as a piston rod and with a piston part 342, with the intermediate telescopic part having a bottom 343 at an axial end and a head 344 with a bore hole at the other axial end.

The intermediate telescopic part 340 extends through the bore hole in the head 333 of the outer telescopic part 330 and the piston part 342 delimits a bottom-side chamber 335 and an annular rod-side chamber 336 in the surrounding cylinder tube 331.

The central telescopic part 350 has a piston rod 351 and a piston part 352, in such a manner that the piston rod 351 extends through the bore hole in the head 344 of the surrounding intermediate telescopic part 340 and the piston part 352 delimits a bottom-side chamber 345 and an annular rod-side chamber 346 in the tubular piston rod of the surrounding intermediate telescopic part 340.

The first connection port 321 is in this case provided at the bottom of the outer telescopic part 330, and the tilting cylinder is such that—in each position of the tilting cylinder—this first connection port 321 is in direct communication with the bottom-side chamber 335 in the outer telescopic part 330.

The second connection port 322 together with the associated opening 322a is provided at the head 333 of the outer telescopic part 330. Compared to the embodiments from FIGS. 1-4, in which the second connection port is provided on the innermost intermediate telescopic part, arranging the second connection port 322 on the tube body and/or on the head of the outer telescopic part 330 offers the advantage that no hose is required which can follow the reciprocating movement of the intermediate telescopic part. A hose of this kind, which would have to follow this movement, is relatively fragile and/or takes up more space than is desirable.

In addition, an open passage 348 which, as is preferred here, has no valves, is provided in the bottom 343 of the intermediate telescopic part, which passage 348—in each position of the tilting cylinder—extends between the bottom-side chamber 345 in the respective intermediate telescopic part and the bottom-side chamber 335 of the surrounding telescopic part 330.

Figure 5B:
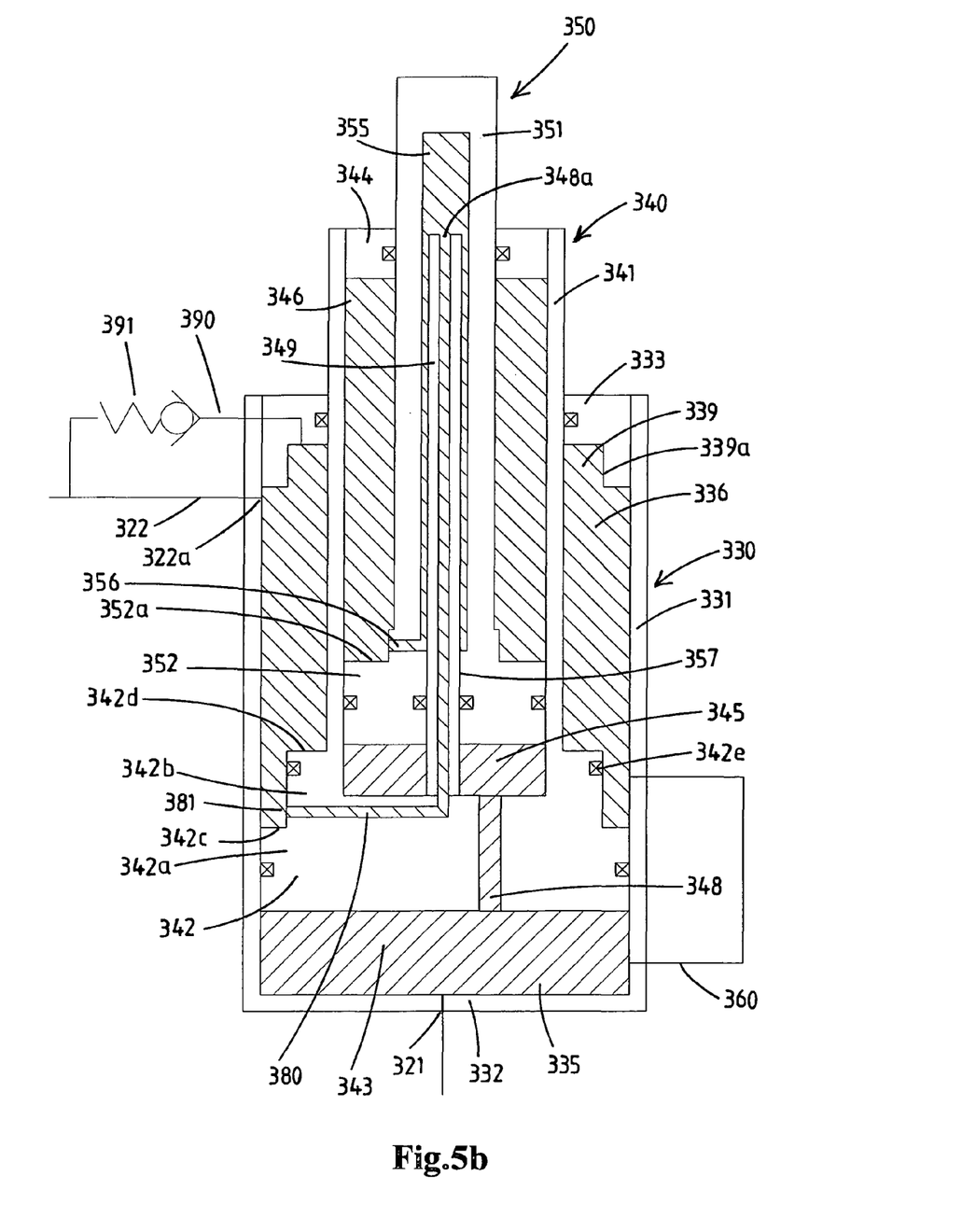
FIG. 5*b* shows the tilting cylinder from FIG. 5*a* on an enlarged scale, FIG. 6 diagrammatically shows the embodiment from FIG. 5*a* with the intermediate telescopic part in the fully extended position.

The piston part 342 of the outermost, in this case single, intermediate telescopic part 340 is of stepped design with a first piston part 342a, which sealingly interacts with the cylinder tube 331 of the outer telescopic part 330, and with—on the side of the rod-side chamber 336 of the outer telescopic part 330—a second piston part 342b having a smaller diameter than the first piston part 342a, so that the piston part 342—on the side of said rod-side chamber 336—has an outer annular surface 342c and an inner annular surface 342d on which the liquid pressure can act in the axial direction. As is preferred, the size of the active surface of that outer annular surface 342c is smaller than that of the annular surface 352a of the piston part 352 of the central telescopic part 350 on the side of the surrounding rod-side chamber 346.

The head 333 of the outer telescopic part 330 is also of stepped design and forms a recess 339 into which the second piston part 342b of the intermediate telescopic part 340 fits, with the recess 339 and the second piston part 342b having mating sealing surfaces. In the illustrated version, the second piston part 342b is provided with a sealing ring 342e and the recess with a peripheral sealing surface 339a.

The outermost, in this case single, intermediate telescopic part 340 is provided with a through-passage 380 which, at one end, has an opening 381 at the outer annular surface 342c, in this case in the periphery of the step to the second piston part 342b, and which, at the other end, ends at the annular rod-side chamber 346 in the tubular piston rod of that intermediate telescopic part which is situated directly around the central telescopic part 350.

FIG. 6 shows that the stepped embodiment of the piston part 342 and of the head 333 is such that, in the fully extended position of the intermediate telescopic part 340, hydraulic fluid supplied via the second connection 322 only acts on the outer annular surface 342c, and not on the inner annular surface 342d. The supplied liquid enters the space between that annular surface 342c and the head 333 and then runs via the opening 381 in the through-passage 380 and via that duct 380 into the rod-side chamber 346 which surrounds the central telescopic part 350.

With the preferred embodiment shown in FIGS. 5a, b and 6, the central telescopic part 350 is provided with an elongate internal cavity 355, which is in communication with the surrounding rod-side chamber 346 via a transverse bore hole 356. Also, the bottom of the central telescopic part has a central bore hole 357, in line with the cavity 355.

The intermediate telescopic part 340 is provided with a centrally arranged tube element 349 which is connected to the bottom 343 and which extends from the bottom 343 in the direction towards the head of the telescopic part 340. This centrally arranged tube element 349 forms part of the through-passage 380. The centrally arranged tube element 349 is inside the central bore hole 357 of the central telescopic part 350, with the central telescopic part being provided with a sealing with respect to the central tube element 349.

When liquid is supplied to the second connection 322 under pressure, this liquid can thus, via the opening 332a and the opening 381, run into the through-passage 380 which extends through the tube element 349. The tube element 349 has an opening 348a, preferably on or near the free end of the tube element, which is in communication with the cavity 355 in the piston rod 351. Via the transverse bore hole 356, which is preferably provided near or in the piston part 352, the liquid then flows into the rod-side chamber 346. The liquid can flow out of the chamber 346 via the same route.

FIGS. 5a, b furthermore also diagrammatically show an outlet duct 390 which is provided near the head 333 of the outer telescopic part 330. The duct 390 connects the recess 339 in the head 333 to the second connection 322, in such a manner that when, during the extension of the outermost intermediate telescopic part 340, the sealing surfaces of this head 333 and the second piston part 342b sealingly interact via the outlet duct 390, liquid can then escape from the recess 339 which is effectively closed off. A non-return valve facility 391 which seals with respect to the recess 339 is provided in order to prevent an undesirable flow into the recess 339, as will be explained in more detail.

In order to extend the telescopic tilting cylinder 320, at least the first connection port and preferably also the second connection port are connected to the pump port which delivers pressurized liquid, so that—from the retracted position— first the intermediate telescopic part 340 together with the central telescopic part 350 extends, until the intermediate telescopic part reaches its maximum extended position. As explained, during the last part of said extending movement, when the second piston part 342b sealingly comes to lie in the recess 339, liquid will flow out of said recess via outlet duct 390. Then, the central telescopic part 350 will also extend by liquid being supplied to the chamber 345 and flowing out of chamber 346 via transverse bore hole 356, the cavity 355, the tube element 349 and the other part of the duct 380, via opening 381 to the second connection 322.

In order to retract the telescopic tilting cylinder, the second connection port 322 is connected to the pump port 2 which delivers pressurized liquid when the pump 1 is operated, and the first connection port 321 is connected to the reservoir 3. As a result thereof, first the central telescopic part 350 is pushed in from its extended position. In this case, the fact that the dimensions of the annular surface 342c are smaller than those of annular surface 352a plays a part. When the central telescopic part 350 is completely retracted, the intermediate telescopic part starts to move and then slides in, together with the central telescopic part.

In FIGS. 5a, b, reference numeral 360 denotes a lost-motion facility which may be designed in a variety of ways, for example as explained with reference to FIG. 1 or 3.

It will be clear to those skilled in the art that instead of a stepped embodiment of the piston part 342 and the head 333, other embodiments may also produce the same effect. For example, the outer and inner annular surfaces 342c, 342d may be in a common plane with a sealing ring protruding towards the head 333 in between, in which case the head 333 then does not have a recess 339, but is flat on that side which is turned towards the piston part 342. As long as this sealing ring, which is, for example, of an elastic type which can be compressed to a relatively large degree, then sealingly rests against the head 333, the same sealing action is produced as between the stepped piston part and the head. Also, such a sealing ring in the piston part could be an elastic sealing ring which is arranged so as to be displaceable in the axial direction, which temporarily produces a sealing between an inner and an outer zone in said rod-side chamber when the outer intermediate telescopic part is extended from the fully retracted position.

It will also be clear to those skilled in the art that the openings 322a and 381 could also be arranged on the other side of the interacting sealing surfaces.

The variant illustrated in FIG. 7 not only has the outermost intermediate telescopic part 340, but also a further inwardly situated telescopic part 400. If desired, several telescopic parts 400 may be provided, but in practice a single telescopic part 400 will often be advantageous.

The intermediate telescopic part 400 is provided with a central tube element 401 which extends from the bottom in the direction towards the head of the respective telescopic part. Furthermore, a central bore hole 402 is arranged in the bottom, so that the tube element 349 of the surrounding telescopic part 340 extends through this central bore hole 402 in the central tube element 401.

In the telescopic part 400—and when several intermediate telescopic parts are present, in each intermediate telescopic part, with the exception of the outermost intermediate telescopic part—a further passage 403 is present, which, at one end, ends near the annular rod-side chamber 404 in the surrounding telescopic part and which, at the other end, ends at an opening on the inner side of the respective intermediate telescopic part 400, which opening is arranged in such a manner that, in a retracted position of the telescopic part 350 situated therein, the respective opening is in direct communication with the annular rod-side chamber 346 in the respective intermediate telescopic part in which the opening is provided and, in an at least partly extended position of the telescopic part 350 situated therein, is in communication with the bottom-side chamber 347 in the respective intermediate telescopic part in which the opening is provided.

Referring to this explanation of FIG. 7, those skilled in the art will understand that this embodiment works in the same way as the embodiment which has been explained with reference to FIGS. 5*a, b* and 6.

The invention claimed is:

1. Vehicle cab tilting device for a vehicle with a tiltable cab, a chassis and pivot means which connect the cab to the chassis, in which the cab can be tilted through an angle with respect to the chassis between a driving position and a forwardly tilted position, in which the tilting device comprises:
   a pump having at least one pump port for delivering pressurized hydraulic fluid,
   a reservoir for hydraulic fluid,
   a hydraulic tilting cylinder for tilting the cab, which tilting cylinder has a first and a second connection port,
in which the tilting cylinder is a multistage telescopic hydraulic tilting cylinder with an outer telescopic part, at least one intermediate telescopic part, and a central telescopic part, each intermediate telescopic part and the central telescopic part being displaceable with respect to one another and to the outer telescopic part,
in which the outer telescopic part has a cylinder tube which is provided with a bottom at an axial end and a head with a bore hole at the other axial end,
in which each intermediate telescopic part is arranged in the cylinder tube of the outer telescopic part and is provided with a cylinder tube including a piston rod and a piston part, in which the intermediate telescopic part has a bottom at an axial end and a head with a bore hole at the other axial end, such that the piston rod of an intermediate telescopic part extends through the bore hole in the head of a surrounding telescopic part and the piston part delimits a bottom-side chamber and an annular rod-side chamber in the surrounding cylinder tube,
in which the central telescopic part has a piston rod and a piston part, such that the piston rod extends through the bore hole in the head of the surrounding intermediate telescopic part and the piston part delimits a bottom-side chamber and an annular rod-side chamber in the tubular piston rod of the surrounding intermediate telescopic part,
in which the first connection port is provided in such a manner that in each position of the telescopic cylinder it is in direct communication with the bottom-side chamber in the outer telescopic part,
in which the second connection port is provided in such a manner that in each position of the telescopic tilting cylinder it is in direct communication with the rod-side chamber in the tubular piston rod of that intermediate telescopic part which directly surrounds the central telescopic part,
in which furthermore a passage is present in the bottom of each intermediate telescopic part, which passage in each position of the telescopic tilting cylinder extends between the bottom-side chamber in the respective intermediate telescopic part and the bottom-side chamber of the surrounding telescopic part,
in which furthermore a through-passage is present in each intermediate telescopic part which, at one end, ends at the annular rod-side chamber in the surrounding telescopic part and which, at the other end, ends at an opening on the inner side of the respective intermediate telescopic part, which opening is arranged in such a manner that, in a retracted position of the telescopic part situated inside, the respective opening is in direct communication with the annular rod-side chamber in the respective intermediate telescopic part in which the opening is provided, and, in an at least partly extended position of the telescopic part situated inside, is in communication with the bottom-side chamber in the respective intermediate telescopic part in which the opening is provided,
in which, in order to extend the telescopic tilting cylinder, at least the first connection port is connected to the pump port, so that from the retracted position the one or more intermediate telescopic parts together with the central telescopic part extend first, until the outermost intermediate telescopic part reaches its maximum extended position, after which all remaining telescopic parts together extend further, which process is repeated until the central telescopic part is also finally extended with respect to the surrounding intermediate telescopic part, and
in which, in order to retract the telescopic tilting cylinder, the second connection port is connected to the pump port and the first connection port to the reservoir, so that from the extended position the central telescopic part retracts first, until the piston part thereof passes the opening of the through-passage and thus connects the piston-rod-side chamber to which the second connection port is connected to the piston rod-side chamber of the surrounding telescopic part, so that the central telescopic part together with the surrounding intermediate telescopic part is then retracted, which process is repeated when two or more intermediate telescopic parts are present, until the one or more intermediate telescopic parts and the central telescopic part are completely retracted.

2. Vehicle cab tilting device according to claim 1, in which the piston rod of the central telescopic part is solid.

3. Vehicle cab tilting device according to claim 1, in which the second connection port is arranged on the central telescopic part, in which a duct extends from the second connection port through the central telescopic part and opens into the rod-side chamber of the surrounding intermediate telescopic part.

4. Vehicle cab tilting device according to claim 1 in which the passage which is present in the bottom of each intermediate telescopic part is an open passage which has no valves, in which this open passage is optionally designed as a throttle.

5. Vehicle cab tilting device according to claim 1, in which the passage is provided with a valve assembly which is operated by pressure difference and has one or more valves, which valve assembly is closed below a certain pressure difference between the chambers connected by the passage, and open at a pressure difference which is greater than said pressure difference value which is, in this case, for example 1 bar.

6. Vehicle cab tilting device according to claim 1, in which the outer telescopic part is provided with a lost-motion bypass, in such a manner that a bypass section of the axial movement of the outermost intermediate telescopic part, the rod-side chamber and the bottom-side chamber in the outer telescopic part are in communication with one another.

7. Vehicle cab tilting device according to claim 1, in which the outer telescopic part is provided with first attachment means designed for attaching the former to the cab of the vehicle, and in which the piston rod of the central telescopic part is provided with second attachment means designed for attaching the former to the chassis of the vehicle.

8. Vehicle cab tilting device according to claim 1, in which furthermore a lost-motion connection is provided between a bypass passage in the outer telescopic part and the first connection port of the tilting cylinder, which lost-motion connection is provided with one or more hydraulic valves.

9. Vehicle cab tilting device for a vehicle with a tiltable cab, a chassis and pivot means which connect the cab to the chassis, in which the cab can be tilted through an angle with respect to the chassis between a driving position and a forwardly tilted position, in which the tilting device comprises:
  a pump having at least one pump port for delivering pressurized hydraulic fluid,
  a reservoir for hydraulic fluid,
  a hydraulic tilting cylinder for tilting the cab, which tilting cylinder has a first and a second connection port,
in which the tilting cylinder is a multistage telescopic hydraulic tilting cylinder with an outer telescopic part, at least one intermediate telescopic part, and a central telescopic part, each intermediate telescopic part and the central telescopic part being displaceable with respect to one another and to the outer telescopic part,
in which the outer telescopic part has a cylinder tube which is provided with a bottom at an axial end and a head with a bore hole at the other axial end,
in which each intermediate telescopic part is arranged in the cylinder tube of the outer telescopic part and is provided with a cylinder tube including a piston rod and a piston part, in which the intermediate telescopic part has a bottom at an axial end and a head with a bore hole at the other axial end, such that the piston rod of an intermediate telescopic part extends through the bore hole in the head of a surrounding telescopic part and the piston part delimits a bottom-side chamber and an annular rod-side chamber in the surrounding cylinder tube,
in which the central telescopic part has a piston rod and a piston part, such that the piston rod extends through the bore hole in the head of the surrounding intermediate telescopic part and the piston part delimits a bottom-side chamber and an annular rod-side chamber in the tubular piston rod of the surrounding intermediate telescopic part,
in which the first connection port is provided near the bottom of the outermost telescopic part, and in which the tilting cylinder is such that this first connection port in each position of the tilting cylinder is in direct communication with the bottom-side chamber in the outer telescopic part,
in which the second connection port is provided near the head of the outermost telescopic part,
in which furthermore a passage is present in the bottom of each intermediate telescopic part, which passage in each position of the tilting cylinder extends between the bottom-side chamber in the respective intermediate telescopic part and the bottom-side chamber of the surrounding telescopic part,
in which the piston part of the outermost intermediate telescopic part on the side of the rod-side chamber has an outer annular surface and an inner annular surface on which the liquid pressure can act in the axial direction, between which annular surfaces the piston part has a sealing surface,
in which the head of the outer telescopic part has a sealing surface which, in the fully extended position of the outermost intermediate telescopic part sealingly interacts with the sealing surface of the piston part of that telescopic part,
in which the outermost intermediate telescopic part is provided with a through-passage, which, at one end, has an opening in the piston part thereof on the side of the rod-side chamber and, at the other end, ends at the annular rod-side chamber in the tubular piston rod of that intermediate telescopic part which is situated directly around the central telescopic part,
in which the second connection has an opening at the rod-side chamber in the outer telescopic part,
in which the opening of the second connection and the opening of the through-passage are arranged in such a manner that even when the outermost intermediate telescopic part is in its fully extended position, the openings are in communication with one another, so that in this fully extended position hydraulic fluid delivered via the second connection acts on only one of the annular surfaces of the piston part as long as the sealing surfaces of the piston part and of the head interact sealingly, and runs into the rod-side chamber surrounding the central telescopic part via the through-passage,
in which—when several intermediate telescopic parts are present—in each intermediate telescopic part, with the exception of the outermost intermediate telescopic part, a further passage is present, which, at one end, ends near the annular rod-side chamber in the surrounding telescopic part and which, at the other end, ends at an opening on the inner side of the respective intermediate telescopic part, which opening is arranged in such a manner that, in a retracted position of the telescopic part situated therein, the respective opening is in direct communication with the annular rod-side chamber in the respective intermediate telescopic part in which the opening is provided and, in an at least partly extended position of the telescopic part situated therein, is in communication with the bottom-side chamber with the respective intermediate telescopic part in which the opening is provided,
in which, in order to extend the telescopic tilting cylinder, at least the first connection port is connected to the pump port, so that from the retracted position the one or more intermediate telescopic parts together with the central telescopic part extend first, until the outermost intermediate telescopic part reaches its maximum extended position, after which all remaining telescopic parts together extend further, which process is repeated until the central telescopic part is also finally extended with respect to the surrounding intermediate telescopic part, and
in which, in order to retract the telescopic tilting cylinder, the second connection port is connected to the pump port and the first connection port to the reservoir, so that from the extended position the central telescopic part retracts first, and subsequently the central telescopic part together with the surrounding intermediate telescopic part then retracts, which process is repeated when two or more intermediate telescopic parts are present, until the one or more intermediate telescopic parts and the central telescopic part are completely retracted.

10. Vehicle cab tilting device according to claim 9, in which the piston part of the outermost intermediate telescopic part is of stepped design with a first piston part, which sealingly interacts with the cylinder tube of the outer telescopic part, and with—on the side of the rod-side chamber of the outer telescopic part—a second piston part having a smaller diameter than the first piston part, so that the first piston part forms the outer annular surface and the second piston part forms the inner annular surface,
in which the head of the outer telescopic part is also of stepped design and forms a recess into which the second piston part of the intermediate telescopic part fits, in which the recess and the second piston part have interacting sealing surfaces.

11. Vehicle cab tilting device according to claim 10, in which an outlet duct is provided at the head of the outer telescopic part, which connects the recess in the head to the second connection, in such a manner that when, during the extension of the outermost intermediate telescopic part, the sealing surfaces of this head and the second piston part come to interact sealingly via the outlet duct, liquid can escape from the recess.

12. Vehicle cab tilting device according to claim 9, in which the dimensions of the annular surface on which hydraulic fluid supplied via the second connection acts in the fully extended position of the outermost intermediate telescopic part are smaller than those of the annular surface of the piston part of the central telescopic part on the side of the surrounding rod-side chamber.

13. Vehicle cab tilting device according to claim 9, in which the opening in the piston part of the outermost intermediate telescopic part and the opening of the second connection are arranged in such a manner that, in the fully extended position of the outermost intermediate telescopic part, hydraulic fluid supplied via the second connection only acts on the outer annular surface of the piston part as long as the sealing surfaces of the piston part and of the head interact sealingly.

14. Vehicle cab tilting device according to claim 9, in which the central telescopic part has an internal cavity which is in communication with the surrounding rod-side chamber via a transverse bore hole, in which the bottom of the central telescopic part has a central bore hole,
in which the outermost intermediate telescopic part is provided with a centrally arranged tube element which extends from the bottom in the direction towards the head of the telescopic part,
in which the centrally arranged tube element forms a part of the through-passage of the outermost telescopic part,
in which, when a single intermediate telescopic part is present, the centrally arranged tube element extends through the central bore hole of the central telescopic part,
and in which, when several intermediate telescopic parts are present, a further inwardly arranged intermediate telescopic part is provided with a central tube element which extends from the bottom in the direction towards the head of the respective telescopic part and is provided with a central bore hole in the bottom, so that the tube element of the surrounding telescopic part extends through this central bore hole in the central tube element.

15. Vehicle with a tiltable cab, a chassis and pivot means which connect the cab to the chassis, in which the cab can be tilted through an angle with respect to the chassis about a pivot axis defined by the pivot means between a driving position and a forwardly tilted position, in which the vehicle is provided with a vehicle cab tilting device according to any one of the preceding claims.

* * * * *